Jan. 16, 1923.
D. M. TULLOCH.
ANGULAR PIPE COUPLING.
FILED JAN. 23, 1919.
1,442,371.
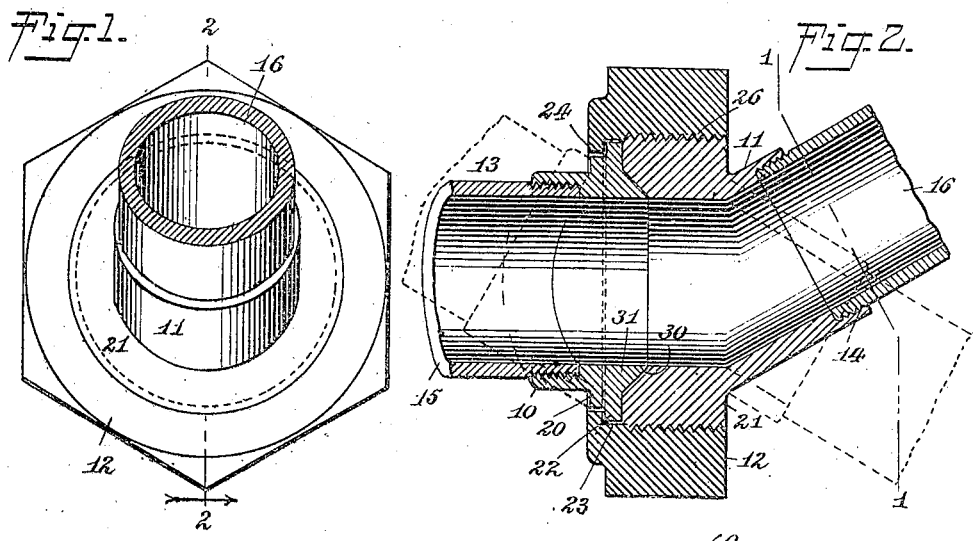
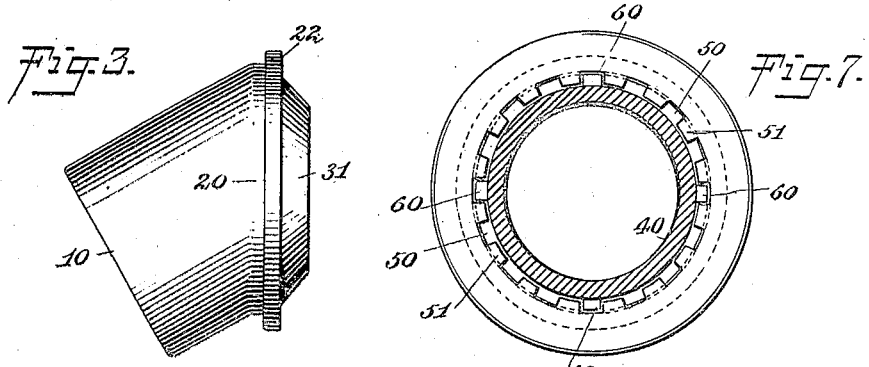
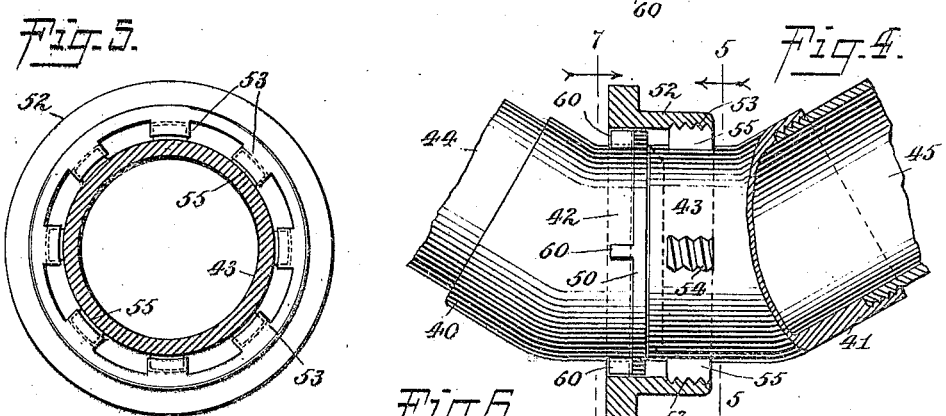
WITNESSES
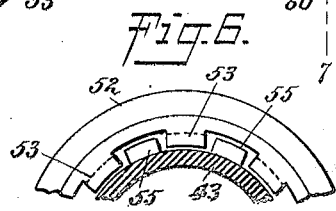
INVENTOR
David M. Tulloch.
BY
ATTORNEYS Patented Jan. 16, 1923.

1,442,371

UNITED STATES PATENT OFFICE.

DAVID M. TULLOCH, OF DUNELLEN, NEW JERSEY.

ANGULAR PIPE COUPLING.

Application filed January 23, 1919. Serial No. 272,686.

*To all whom it may concern:*

Be it known that I, DAVID M. TULLOCH, a citizen of the United States, and a resident of Dunellen, in the county of Middlesex and State of New Jersey, have invented a new and Improved Angular Pipe Coupling, of which the following is a full, clear, and exact description.

Among the objects of my invention may be noted the following: to provide a pipe coupling capable of being arranged to connect pipe sections at any desired angle relatively to the longitudinal axis of the coupling sections, and without the use of bolts or similar fastening devices; to provide a pipe coupling constructed so as to produce a tight joint between the members thereof so as to prevent leakage of the fluid passing through the coupling, without the use of gaskets, packing or similar media; to provide a pipe coupling by which pipe sections may be coupled and uncoupled readily and easily, regardless of the angular position of one pipe section relatively to the other; to provide a coupling which will join sections of pipes without restricting the passage from one section to the other; to provide a coupling for pipe sections which has a passage therethrough equal in diameter in all directions to the passage of the sections coupled; to provide a coupling for pipe sections either member of which can be adjusted universally around the longitudinal axis of the other; to provide a pipe coupling of a construction such as to enable adjustments of the coupling members so as to make either a straight line passage through the coupling and connected pipe sections, or a passage through the coupling members universally about the longitudinal axis of the coupling sections at the point of juncture, and without restricting the said passage in any diametrical direction.

With these and other objects in view, the invention consists of certain novel features of construction as hereinafter shown and described and then specifically pointed out in the claim.

A practical embodiment of the invention is represented in the accompanying drawings forming a part of this specification, in which similar characters of reference indicate corresponding parts in all the views.

Figure 1 is a cross section on the line 1—1 of Figure 2;

Figure 2 is a longitudinal central section of my coupling on the line 2—2 of Figure 1;

Figure 3 is a side elevation of one of the coupling sections;

Figure 4 is a sectional side elevation of another form of the coupling with parts shown in elevation;

Figure 5 is a cross section on the line 5—5 of Figure 4;

Figure 6 is a view similar to Figure 5 with the parts in another position; and

Figure 7 is a cross section on the line 7—7 of Figure 4.

The improved coupling illustrated in Figures 1, 2 and 3 comprises two sections 10 and 11 and a union coupling nut 12. The sections 10 and 11 are each composed of a coupling member and a supporting member for securing a pipe section thereto, said supporting members being provided at their outer ends with interior screw threads 13 and 14 into which screw the adjacent ends of the two pipe sections 15 and 16 to be connected with each other by the coupling, as plainly shown in Figure 2. The coupling members 20 and 21, respectively, of the sections 10 and 11, each has its axis arranged at an angle to the axis of the supporting member and the coupling member 20 of the section 10 is provided with a flange 22 engaging a seat 23 formed in the union nut 12 adjacent to its interior flange 24 against which abuts the flange 22, as plainly shown in Figure 2. The end 21 of the coupling member 11 is provided with a circumferential screw-thread 25 on which screws the interior thread 26 formed on the nut 12 to securely fasten the two adjacent inner ends 20 and 21 of the sections 10 and 11 together. It is understood that on screwing up the union nut 12 on the threaded end 21, the flange 24 moves the flange 22 into firm contact with the inner end 21 to provide a tight joint between the two sections.

In order to increase the efficiency of this joint, the end 21 of the section 11 is provided with a conical seat 30 into which fits a conical extension 31 formed on the inner face of the end 20 of the section 10. The seat 30 and the projection 31 provide a crown joint to prevent leakage of the liquid or gas passing through the pipe line. It will be noticed that when the parts of the coupling are loosely assembled, the sections 10 and 11 can be readily turned into any angular position, one relative to the other, about the longitudinal axis of the latter, to receive the threaded ends of the pipes 15 and 16, respectively, arranged at the desired angle one relative to the other. Thus the pipes can be readily connected with each other while in angular position, it being only necessary to screw the pipes into the threaded members and to fasten the latter firmly together by screwing up the union nut 12.

In the form of my invention shown in Figures 4, 5, 6 and 7, the sections 40 and 41 have their respective inner ends 42 and 43 at an angle to their outer ends in which latter screw the ends, respectively, of the pipes 44 and 45 to be fastened together. The inner end 42 of the section 40 is provided with a flange 50 adapted to abut against lugs 51 formed interiorly on a union nut 52 provided with an interior mutilated screw-thread 53 screwing on a mutilated thread 54 formed on lugs 55 arranged exteriorly on the inner end 43 of the section 41. By the arrangement described, the union nut 52 can be readily engaged with the inner end 43 of the section 41 by passing the threads 53 between the lugs 55 and then giving a short turn to the union nut to engage the threads 53 with the threads 54. The end 42 of the section 40 is provided with lugs 60 connecting with the flange 50 and adapted to pass between the lugs 51 (see Figure 7) to hold the union nut 52 against turning on the inner end 42 of the section 40, thus securely locking the union nut in position. It will be noticed that, by the arrangement described, the coupling nut 52 needs only to be turned a short distance to screw onto the end 43 of the section 41, and by passing the lug 60 between the lugs 51 the coupling 52 is locked against rotation on the other section 40, thus securely holding the parts of the coupling locked together.

From the foregoing, it will be seen that it is immaterial at what angle the sections may be adjusted, so far as the size of the passage through them is concerned, said passage remaining unrestricted and of uniform diameter in all directions, regardless of adjustment of the parts. This is an important feature of my invention in all its uses.

Having thus described my invention, I claim as new and desire to secure by Letters Patent:—

An angular pipe coupling comprising two sections each having its outer end at an angle to the inner end, the outer ends being adapted to receive the adjacent ends of the pipes to be coupled together, the sections being provided at their inner ends with right-angle flanges of which one is provided circumferentially with a screw-thread and the other is provided with locking lugs, and a coupling nut having at one end an interior screw-thread screwing on the said threaded flange and having at the other end a notched flange forming a seat for the corresponding section flange to abut against, the lugs of this section flange engaging the notches in the nut flange to hold the latter against turning.

DAVID M. TULLOCH.